United States Patent [19]

Nakajima et al.

[11] 4,350,129
[45] Sep. 21, 1982

[54] SPARK-IGNITION INTERNAL COMBUSTION ENGINE CAPABLE OF PREVENTING NOXIOUS GAS EMISSIONS

[75] Inventors: Yasuo Nakajima, Yokosuka; Yoshimasa Hayashi; Shin-ichi Nagumo, both of Yokohama; Tooru Yoshimura, Yokosuka, all of Japan

[73] Assignee: Nissan Motor Company, Limited, Yokohama, Japan

[21] Appl. No.: 893,693

[22] Filed: Apr. 5, 1978

Related U.S. Application Data

[63] Continuation-in-part of Ser. No. 728,599, Oct. 1, 1976, abandoned.

[51] Int. Cl.³ .................. F02D 13/04; F02B 32/00; F02M 7/00; F01L 1/34
[52] U.S. Cl. .................. 123/440; 123/640; 123/638; 123/445; 123/90.15; 123/90.17
[58] Field of Search ............ 123/90.15, 90.17, 119 A, 123/148 C, 148 DS, 119 EC, 32 EA, 90.55, 440, 638, 445, 640; 60/276, 278

[56] References Cited

U.S. PATENT DOCUMENTS

| | | | |
|---|---|---|---|
| 3,779,013 | 12/1973 | Faber et al. | 60/278 |
| 3,786,792 | 1/1974 | Pelizzoni et al. | 123/90.17 |
| 3,888,216 | 6/1975 | Miokovic | 123/90.17 |
| 3,890,946 | 6/1975 | Wahl | 123/32 EE |
| 3,906,910 | 9/1975 | Szlaga, Jr. | 123/119 R |
| 3,921,612 | 11/1975 | Aono | 123/119 EC |
| 3,929,115 | 12/1975 | Yamauti et al. | 123/148 DS |
| 3,973,529 | 8/1976 | Wessel et al. | 60/276 |
| 4,020,806 | 5/1977 | Aoyama et al. | 123/90.55 |
| 4,084,557 | 4/1978 | Luria | 123/90.15 |
| 4,117,813 | 10/1978 | Yamashita et al. | 123/90.15 |

*Primary Examiner*—Raymond A. Nelli
*Attorney, Agent, or Firm*—Schwartz, Jeffery, Schwaab, Mack, Blumenthal & Koch

[57] ABSTRACT

An engine is provided with two spark plugs in each combustion chamber to ignite stoichiometric air-fuel mixture mixed with a large proportion of inert gases to lower NOx emission level. The engine is equipped with hydraulic valve lifters which are mechanically connected to intake and exhaust valves to control the valve overlap of the intake and exhaust valves. By the action of the valve lifters, the valve overlaps are increased in the normal driving operation range of the engine to prevent discharge at the terminal stage of exhaust valve opening exhaust gases containing a considerably large amount of hydrocarbons.

19 Claims, 8 Drawing Figures

SPARK-IGNITION INTERNAL COMBUSTION ENGINE CAPABLE OF PREVENTING NOXIOUS GAS EMISSIONS

BACKGROUND OF THE INVENTION

This application is a continuation-in-part of Application Ser. No. 728,599 now abandoned filed on Oct. 1, 1976.

This invention relates to a spark-ignition internal combustion engine of the type wherein two spark plugs are disposed within each combustion chamber of the engine to reliably ignite an air-fuel mixture mixed with inert gases.

In connection with purification of the exhaust gases discharged from the combustion chambers of a spark-ignition internal combustion engine, it has been already proposed that an air-fuel mixture is combusted in the combustion chamber in the presence of inert gases such as exhaust gases recirculated into the combustion chamber, by ignition with two spark plugs disposed within the combustion chamber (dual spark-ignition system), thereby achieving a considerable decrease in the emission level of nitrogen oxides (NOx) without deterioration of stable engine operation.

This NOx decreasing effect results from the fact that, according to the dual spark-ignition system, the combustion volume alotted to each spark plug is considerably decreased compared with prior art spark ignition system where only one spark plug is disposed within a combustion chamber. Accordingly, combustion of the air-fuel mixture is accomplished within an extremely short period of time and therefore stable combustion of the air-fuel mixture is carried out in the combustion chamber even if a relatively large amount of the inert gas is present with the air-fuel mixture in the combustion chamber. The combustion carried out in the presence of the larger amount of the inert gases lowers the maximum temperature of combustion and consequently suppresses NOx generation during same.

However, it is now required to further improve the NOx generation suppressing effect and to increase the post-combustion NOx reduction of same in order to further decrease the overall NOx emission level of the engine. Additionally, it is also required to decrease the emission levels of carbon monoxide (CO) and hydrocarbons (HC) which are generated by incomplete combustion of fuel.

SUMMARY OF THE INVENTION

It is a general object of the present invention is to provide a spark-ignition internal combustion engine capable of producing very low concentrations of NOx, CO, and HC.

Another object of the present invention is to provide a spark-ignition internal combustion engine in which the NOx emission level is decreased firstly by combusting the air-fuel mixture in the presence of inert gases and thereafter reducing NOx in the three-way catalytic converter, whereas CO and HC emission levels are decreased firstly by combusting an approximately stoichiometric air-fuel mixture and thereafter by oxidizing them in the three-way catalytic converter.

A further object of the present invention is to provide a spark-ignition internal combustion engine, in which the valve overlap between the intake and exhaust valves of the engine is controlled to use burnt or combusted gases remaining in the combustion chamber as a part of the inert gases which are in the combustion chamber for the purpose of reducing the emission level of NOx, whereby the emission level of HC is concurrently decreased to a considerable extent.

A still further object of the present invention is to provide a spark-ignition internal combustion engine of the type where an air-fuel mixture mixed with inert gases is ignited with a dual spark-ignition system, which is further equipped with a three-way catalytic converter for reducing NOx and oxidizing CO and HC, and with an air-fuel ratio control device for controlling the air-fuel ratio of the mixture supplied to the combustion chamber so as to feed the three-way catalytic converter with exhaust gases most suitable for achieving the highest mutual conversion efficiencies in the three-way converter.

Other objects, features, and advantages of the spark-ignition internal combustion engine in accordance with the present invention will become more apparent as the following description of preferred embodiments thereof progresses, taken in conjunction with the accompanying drawings.

DESCRIPTION OF THE PREFERRED EMBODIMENTS

Referring now to FIGS. 1, 2, 3 and 4 of the drawings, a preferred embodiment of a spark-ignition internal combustion engine of a motor vehicle according to the present invention is shown, in which the engine is generally designated by the reference numeral 10. The engine of this instance is an in-line, four cylinder type and therefore the engine proper 11 has four aligned combustion chambers $C_1$ to $C_4$ therein. As clearly shown in FIG. 3, each combustion chamber is defined by the cylindrical inner wall of a cylinder 12 formed in a cylinder block 13, the inner wall of a cylinder head 14 closing the one (upper) end of the cylinder 12 and the crown of a piston 16. Each combustion chamber is communicable through each intake port 18 with an intake manifold 20 of the intake system (no numeral) which manifold communicates with a carburetor 22 forming part of air-fuel mixture supply means 24. Reference numeral 25 indicates intake valves. Furthermore, each combustion chamber communicates through each exhaust port 26 with an exhaust manifold 28 which connects to a connecting pipe 30 forming part of an exhaust passage 31 of the exhaust system (no numeral). The reference numeral 27 indicates exhaust valves. The connecting pipe 30 is connected to a so-called three-way catalytic converter 32 capable of reducing nitrogen oxides (NOx) and oxidizing carbon monoxide (CO) and hydrocarbons (HC). The three-way catalytic converter 32, in turn, communicates with the atmosphere to discharge the exhaust gases purified in the converter 32 into the atmosphere.

Figure 2:
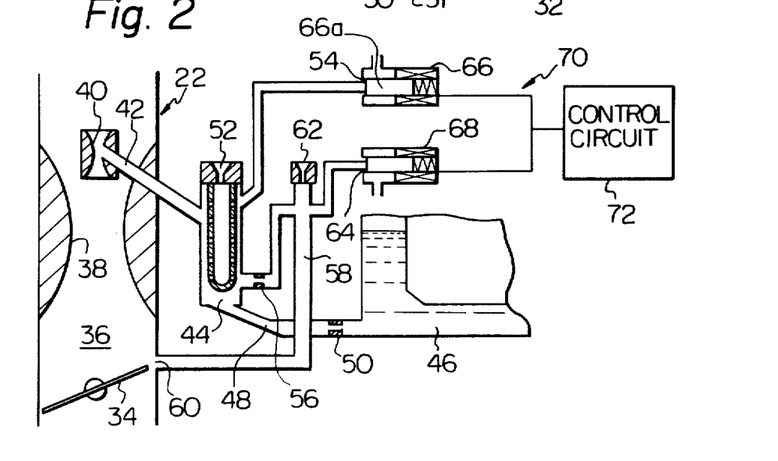
FIG. 2 is a vertical section view of a carburetor employed in the engine of FIG. 1.

As best seen in FIG. 2, the carburetor 22 has a throttle valve 34 rotatably disposed within the air-fuel mixture induction passage 36 thereof. A main venturi portion 38 is located upstream of the throttle valve 34, and a secondary venturi portion 40 is located adjacent the main venturi portion 38. Opened to the secondary venturi portion 40 is a main discharge nozzle 42 of a main circuit (no numeral) which nozzle 42 communicates with a main well 44 which in turn communicates with a float bowl 46 through a main fuel passage 48 having therein a main jet 50. The main well 44 has a main air bleed 52 and a first auxiliary air bleed 54. The main well 44 further communicates through a jet or a restrictor 56 with a fuel passage 58 of a low-speed circuit (no numeral) which passage 58 with a slow port 60 opened to the air-fuel mixture induction passage 36 downstream of the main venturi portion 38. The fuel passage 58 has a low-speed circuit air bleed 62 and a second auxiliary air bleed 64.

A first solenoid valve 66 or first air flow amount control means is disposed for opening or closing the first auxiliary air bleed 54 and arranged to take a first state wherein the actuating rod or member 66a thereof is moved with respect to the first auxiliary air bleed 54 to increase the flow amount of air inducted through the first auxiliary air bleed 54 into the main well 44 above a predetermined level, and to take a second state wherein the actuating rod 66a thereof is moved with respect to the first auxiliary air bleed 54 to decrease the flow amount of the air inducted through the auxiliary air bleed 54 into the main well 44 below the predetermined level. A second solenoid valve 68 or second air flow control means is electrically connected in parallel with the first solenoid valve 66 and arranged to be operated similarly to the first solenoid valve 66. The first and second solenoid valves 66 and 68 form part of air-fuel ratio control means 70 and are electrically connected to a control circuit 72.

The control circuit 72 is arranged to generate a first command signal for placing the first and second solenoid valves 66 and 68 into the first state and a second command signal for placing the first and second solenoid valves 66 and 68 into the second state. The control circuit 72 is electrically connected to an exhaust gas sensor 74 which is disposed within the connecting pipe 30 upstream of the catalytic converter 32. The exhaust gas sensor 74 is arranged to generate a first information signal (which may be a voltage signal) for causing the control circuit 72 to generate the first command signal when the exhaust gases passing through the connecting pipe 30 have a first composition indicating that the combustion chambers are fed with an air-fuel mixture richer than that having the stoichiometric air-fuel ratio (14.8:1), and a second information signal for causing the control circuit 72 to generate the second command signal when the exhaust gases passing through the connecting pipe 30 have a second composition indicating that the combustion chambers 18 are fed with an air-fuel mixture leaner than that having the stoichiometric ratio. The exhaust gas sensor 74 may be oxygen ($O_2$) sensor, a nitrogen oxides (NOx) sensor, a carbon monoxide (CO) sensor, a carbon dioxide ($CO_2$) sensor or a hydrocarbon (HC) sensor which respectively detect the concentrations of $O_2$, NOx, CO, $CO_2$ or HC contained in the exhaust gases discharged from the combustion chambers. In order to operate the first and second air flow amount control means 66 and 68 in the above discussed manner, the control circuit 72 may be arranged to set, as a reference voltage, a specified voltage signal generated by the exhaust gas sensor 74 when the air-fuel mixture having stoichiometric air-fuel ratio is supplied into the combustion chambers, and to generate the first command signal when the level of the voltage signal from the sensor 74 is lower than that of the specified voltage signal, indicating that the combustion chambers are fed with the air-fuel mixture leaner than the stoichiometric mixture and the second command signal when the level of the voltage signal from the sensor 74 is higher than that of the specified voltage signal, indicating that the combustion chambers are fed with the air-fuel mixture richer than the stoichiometric mixture.

Figure 1:
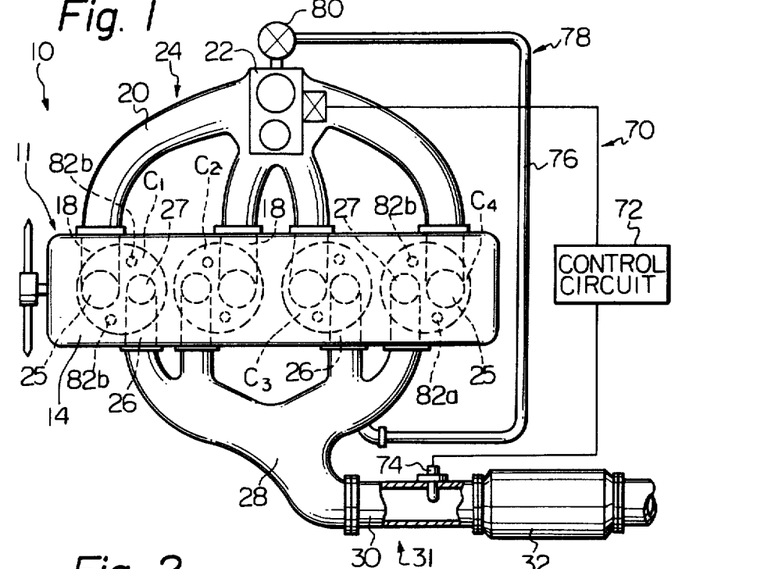
FIG. 1 is a schematic plan view of a preferred embodiment of a spark-ignition internal combustion engine in accordance with the present invention.

Connected to the exhaust manifold 28 and the intake manifold 20 is a conduit 76 or conduit means for recirculating or supplying a portion of the exhaust gases passing through the exhaust manifold 28 into the combustion chambers $C_1$ to $C_4$ through the intake manifold 20. The conduit 76 forms part of exhaust gas recirculating means 78 or an exhaust gas recirculation system. A control valve 80 is disposed in the conduit 76 and is arranged to control the amount of the recirculated exhaust gases with respect to the amount of the intake air induced through the intake system in response, for example, to the venturi vacuum which is a function of the amount of the intake air. The venturi vacuum is generated at the venturi portion of the carburetor 22. The exhaust gas recirculating means 78 functions to add substantially inert gas to the air-fuel mixture in the combustion chamber in combination with means for controlling so-called valve overlap of the intake and exhaust valves 25 and 27.

The valve overlap control means comprises a hydraulic valve lifter which will be explained later with reference to FIGS. 7 and 8. Such a hydraulic valve lifter is disclosed in U.S. Pat. No. 4,020,806 issued on May 3, 1977 to Aoyama et al. The hydraulic valve lifter is mechanically connected to at least one of the intake and exhaust valves and is operative in response to the pressure of the engine oil delivered from an engine oil pump (not shown) which pressure varies with engine speed. Accordingly, the hydraulic valve lifter controls or changes the valve overlap of the intake and exhaust valves 25 and 27 in response to engine speed. As a result, the valve overlap is increased to its maximum at the maximum vehicle cruising speed and decreased to its minimum at idling of the engine.

It will be appreciated that addition of a relatively large amount of the substantially inert gas to the air-fuel mixture in the combustion chamber results in lowering the maximum temperature of the combustion carried out in the combustion chamber, causing a reduction of the NOx emission level. The substantially inert gas consists of mixed gases which substantially do not participate in or are substantially non-reactive during the combustion in the combustion chamber, and therefore include residual gas or combustion (burnt) gas which is finally not discharged from the combustion chamber during the exhaust stroke and remains in the combustion chamber, recirculated exhaust gas which is recirculated or supplied into the combustion chamber by the exhaust gas recirculation system 78, nitrogen gas ($N_2$) contained in the intake air. It will be understood that the residual gas and the recirculated exhaust gas contain amongst other things carbon dioxide ($CO_2$), water vapor ($H_2O$) and nitrogen gas. With respect to the residual gas, it is preferable to control the valve overlap within the range from 35 to 60 degrees of crank angle of the engine to cause 20 to 30% of the residual gas to remain in the combustion chamber in the normal city driving range of the vehicle, and to provide no valve overlap during idling. According to the present invention, the weight ratio of the fuel substantially combusted in the combustion chamber or the fuel in the air-fuel mixture in the combustion chamber and the substantially inert gas added to the air-fuel mixture supplied to the combustion chamber, is selected to be within the range from 1:13.5 to 1:22.5 (this weight ratio will be referred to as "fuel-inert gas ratio" hereinafter) in the normal driving operation range.

Figure 3:
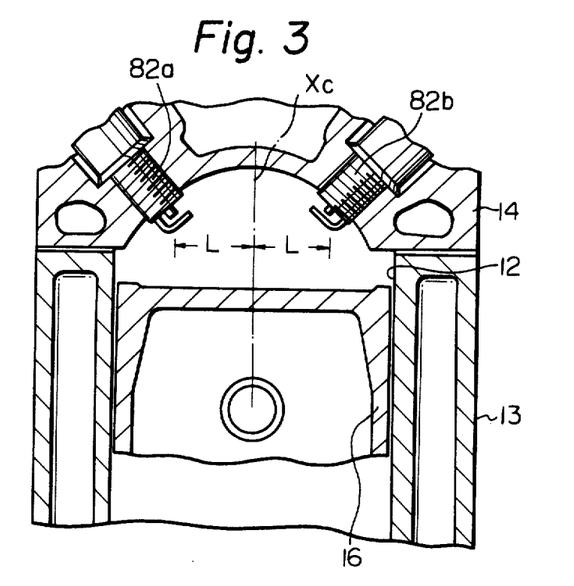
FIG. 3 is a vertical section view of a cylinder portion of the engine of FIG. 1.
Figure 4:
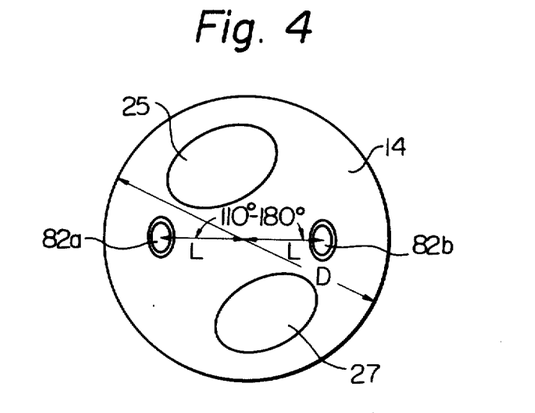
FIG. 4 is a plan view of a cylinder head portion defined by the cylinder of FIG. 3.

In order to reliably ignite the air-fuel mixture mixed with such a large amount of the substantially inert gas, two spark plugs 82a and 82b, as best seen in FIGS. 3 and 4, are disposed in each combustion chamber in such a manner that the two spark plugs 82a and 82b are installed through the cylinder head 14 and their electrodes are projected into each combustion chamber. The two spark plugs 82a and 82b are located spaced oppositely from the center axis Xc of the cylinder 12 and near the periphery of the combustion chamber. The locations of the two spark plugs 82a and 82b are preferably such that an intermediate point of the spark gap or the distance between the two electrodes of the spark plug 82a and an intermediate point of the spark gap of the spark plug 82b constitute an angle ranging from 100 to 180 degrees with respect to the center axis Xc of the cylinder 12, and the shortest distance L between the intermediate point of the spark gap of each spark plug and the center axis Xc is 0.15 to 0.45 times of the diameter D of the cylinder bore.

With this location of the two spark plugs 82a and 82b, the combustion volume alotted to each spark plug is approximately one half of the combustion chamber volume causing shortening of flame propagation distance per spark plug and therefore the combustion time. In general, shortened combustion time results in an improvement in the efficiency of converting combustion energy or pressure into mechanical work, thereby achieving improvement in fuel consumption characteristics and engine power output performance. Additionally, even when the above-mentioned fuel-inet gas ratio is as high as 1:13.5 to 1:22.5, reliable ignition and stable combustion of the air-fuel mixture in the combustion chamber are achieved. If the locations of the two spark plugs 82a and 82b are excessively close to each other, the ignition effect thereof is similar to that in the combustion chamber with only one spark plug. It will be appreciated from the foregoing that the above-mentioned locations of the two spark plugs contribute to reliable ignition and stable combustion of the air-fuel mixture in the combustion chamber.

With respect to the selected fuel-inert gas ratio range: if the ratio of the inert gas is lower than its lower limit 1:13.5, the NOx decreasing effect is reduced, whereas if it is higher than its upper limit 1:22.5, stable combustion in the combustion chamber is not possible even with the most effective ignition with the two spark plugs 82a and 82b. Additionally, the NOx decreasing effect is not improved to any extent by doing same. Unstable combustion in the combustion chamber inevitably causes noticeable deterioration of the fuel economy characteristics and the engine output power performance.

In this connection, the fuel-inert gas ratio is calculated as follows: since the weight ratio of the fuel (gasoline or petrol) and the atmospheric air in the stoichiometric air-fuel mixture is 1:14.7 and the volume ratio of oxygen gas ($O_2$) and nitrogen gas ($N_2$) is 21:79, the weight ratio of the fuel and nitrogen gas is obtained to be 1:11.3. Given the above facts, assuming that the exhaust gases containing the residual gases occupy X% by volume of the amount of intake air, the weight ratio of the fuel and total inert gas in the combustion chamber is represented as $$1 : \left( 11.3 + 14.7 \times \frac{X}{100} \right)$$

since the weight ratio of the air and the exhaust gases or the residual gases is about 1:1. Accordingly when the amount of the exhaust gas recirculated into the combustion chamber is 10% with respect to the amount of intake air and the residual gases occupy 20% of the volume of the intake air, the fuel-inert gas ratio is $$1 : \left( 11.3 + 14.7 \times \frac{10 + 20}{100} \right) = 1 : 15.7.$$

Figure 5:
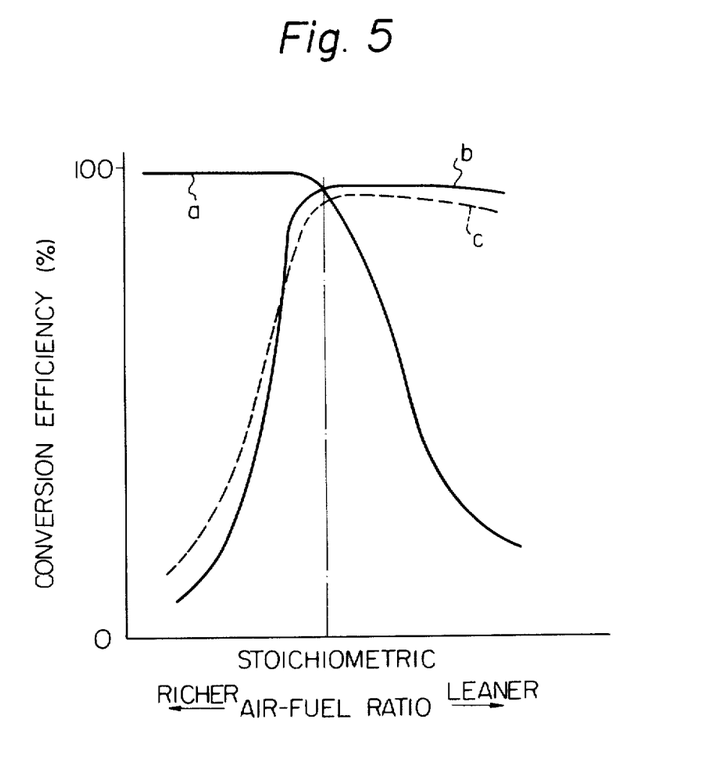
FIG. 5 is a graph showing the characteristics of a three-way catalytic converter employed in the engine of FIG. 1, in terms of conversion efficiency and air-fuel ratio of the mixture supplied to the combustion chamber of the engine of FIG. 1.

FIG. 5 shows the characteristics of the three-way catalytic converter 32, in which the conversion efficiencies of NOx, CO and HC are respectively represented by lines a, b and c, in term of air-fuel ratio of the air-fuel mixture supplied to the combustion chamber of the engine. As is apparent from this figure, it is necessary for obtaining the highest mutual conversion efficiencies of NOx, CO and HC to supply the combustion chamber of the engine with the air-fuel mixture having a narrow air-fuel ratio range including the stoichiometric air-fuel ratio. Accordingly, if an air-fuel mixture leaner or richer than the stoichiometric air-fuel mixture is supplied to the combustion chamber, the efficiency of at least one of NOx, CO and HC abruptly drops. It will be understood from the foregoing that the air-fuel ratio of the air-fuel mixture supplied to the combustion chamber must be strictly controlled at approximately stoichiometric or within the narrow air-fuel ratio range, in order to produce the higherst mutual conversion efficiencies in the three-way catalytic converter 32.

With the arrangement hereinbefore described, during operation of the engine 10, a considerably large amount of the inert gas containing the recirculated exhaust gases through the exhaust gas recirculating means 78 and the residual gas remaining in the combustion chamber is mixed with the air-fuel mixture inducted into the combustion chambers. The air-fuel mixture mixed with the inert gas is ignited and effectively burned by the two spark plugs 82a and 82b disposed within each the combustion chamber. With this spark plug arrangement, when the air-fuel mixture in the combustion chamber is ignited, two flame fronts are produced adjacent the inner wall surface of the combustion chamber, or quench area. These flame fronts move toward the center of the combustion chamber. Therefore, the distance of flame propagation is shortened compared with a conventional engine using only one spark plug. Thus combustion, as a result of the plurality of spark plugs, is faster and completed at the central portion of the combustion chamber thereby accomplishing stable and smooth combustion even though such a large amount of the inert gas is mixed with the air-fuel mixture to be combusted in the combustion chamber. Due to the effect of the inert gas, the maximum temperature within the combustion chambers is lowered and accordingly the emission level of NOx is reduced as compared with the engine without the exhaust gas recirculating means.

It is to be noted that, during the exhaust stroke of the engine, a considerably large amount of HC is discharged out of the combustion chamber both at the initial stage and at the terminal stage of the exhaust valve opening. However, by virtue of the valve overlap, the burnt gas or exhaust gas already in the exhaust system is sucked back into the combustion chamber by the action of vacuum generated due to downward movement of the the piston, which movement intends to suck fresh air-fuel mixture through the opened intake valve. This seems to be a kind of EGR and is called "inner EGR". Since the burnt gas discharged out of the combustion chamber at the terminal stage of the exhaust valve opening is sucked back to the combustion chamber and prevented from being finally discharged to a the exhaust system, the emission level of HC is decreased to considerable extent. It will be understood that the amount of the burnt gas sucked back to the combustion chamber can be controlled by the valve overlap control means including the hydraulic valve lifter. Therefore, the amount of HC introduced into the three-way catalytic converter 32 is greatly decreased to lower the burden of the converter 32 for purifying HC. The HC emission control is desirable to meet the strict exhaust gas emission control regulations in view of the fact that the three-way catalytic converter has, in general, a characteristic whereby HC is relatively difficult to be converted into harmless components as compared with NOx and CO. As a result, according to the present invention, the emission levels of NOx, CO and HC are all effectively decreased to considerable extents. Furthermore, in the normal driving operation range, the valve overlap is increased to increase the proportion of the gases of the inner EGR to cause HC emission to decrease. In other driving operation ranges where stable engine operation is impossible with increased valve overlap, the valve overlap can be decreased to achieve stable engine operation.

Now, when the combustion chambers are fed with the air-fuel mixture richer than that having a stoichiometric air-fuel ratio, the first and second solenoid valves 66 and 68 are operated to increase the amounts of air inducted respectively through the first and second auxiliary air bleeds 54 and 64 into the main well 44 and the fuel passage 58 of the low-speed circuit. Thus, the amount of fuel flowing through the main nozzle 42 and the slow port 60 is decreased and accordingly the air-fuel mixture fed into the combustion chambers is made leaner. On the contrary, when the combustion chambers are fed with the air-fuel mixture leaner than that having stoichiometric air-fuel ratio, the first and second solenoid valves 66 and 68 are operated to decrease the amount of air inducted respectively through the first and second auxiliary air bleeds 54 and 64 into the main well 44 and the fuel passage 58 of the low-speed circuit. Thus, the amount of fuel through the main nozzle 42 and the slow port 60 is increased and accordingly, the air-fuel mixture fed into the combustion chambers is enriched. As discussed above, the air-fuel ratio of the mixture supplied into the combustion chambers can always be maintained accurately at the stoichiometric air-fuel ratio or near same. The relatively small amount of NOx contained in the exhaust gases discharged from the combustion chambers is also further reduced in the three-way catalytic converter 32 to further reduce the emission level thereof.

It will be understood that since the air-fuel ratio of the air-fuel mixture supplied to the combustion chamber is always accurately controlled at approximately stoichiometric, variation or change in the emission level of NOx, CO and HC is minimized providing more accurate and improved control of noxious constituents contained in the exhaust gases.

While the solenoid valves 66 and 68 have been shown and described to control the air amount inducted from the auxiliary air bleeds 54 and 64, it will be understood that similar solenoid valves may be alternately or additionally disposed in the main fuel passage 48 and the low-speed circuit fuel passage 58 in order to directly control the amount of fuel supplied from the main discharge nozzle 42 and the slow port 60.

Figure 6:
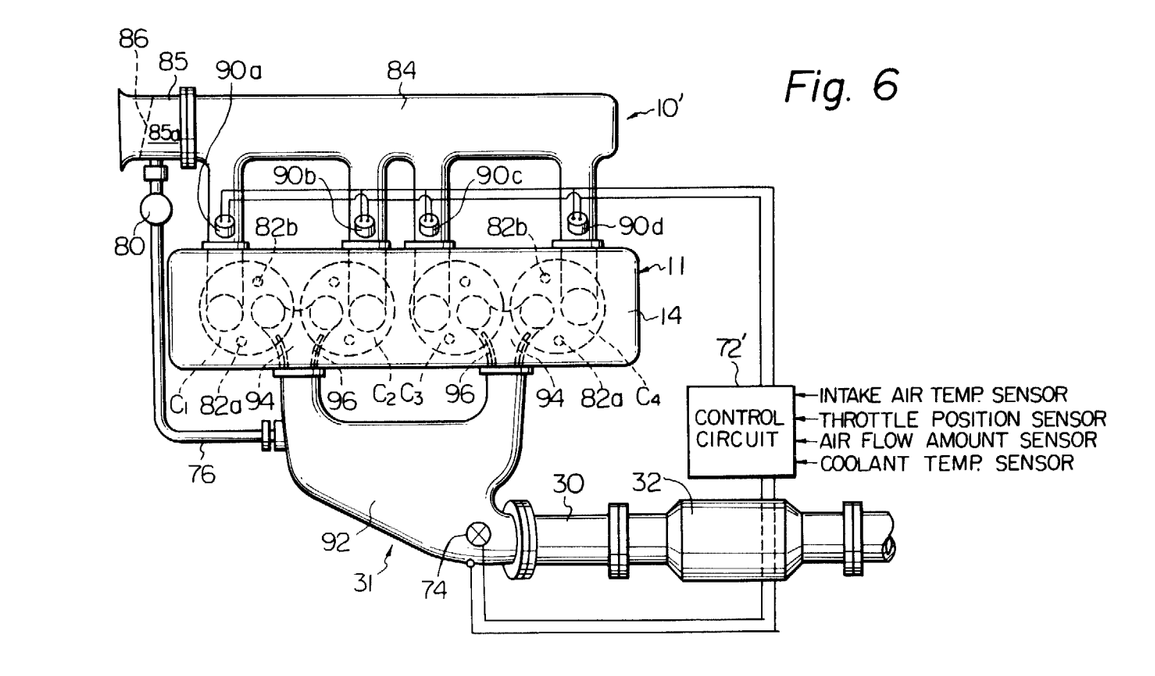
FIG. 6 is a schematic plan view of another preferred embodiment of the spark-ignition internal combustion engine in accordance with the present invention.

FIG. 6 illustrates another preferred embodiment of the spark-ignition internal combustion engine 10' in accordance with the present invention, in which description of similar parts to that of the embodiment in FIG. 1 will be omitted for the purpose of simplicity of explanation by designating like parts by like reference numerals. This engine 10' is similar to that of FIG. 1 except for an electrically controlled fuel injection system employed in place of carburetor 22 of FIG. 1.

As shown, the engine 10' is equipped with intake passage means 84 fluidly communicating with a conduit 85 which defines therein a throttle chamber 85a in which a throttle valve 86 is movably disposed. The intake passage means 84 is formed with four branch passages (no numerals) which are respectively communicable with the four combustion chambers $C_1$ to $C_4$. Disposed respectively at the four branch passages are fuel injectors 90a, 90b, 90c and 90d forming part of an electronically controlled fuel injection system. The injectors extend into the branch passages of the intake passage means 84 to inject a fuel mist into the air stream passing through the branch passages. Accordingly, the fuel mist from the injectors is inducted into the combustion chambers with air and recirculated exhaust gas to form the air-fuel mixture within the combustion chambers.

Each fuel injector is arranged to take the first state wherein the injection time duration for injecting the fuel is decreased below a predetermined level to decrease the amount of fuel injected by one injection and a second state wherein the injection time duration is increased above the predetermined level to increase the amount of fuel injected by one injection. Each fuel injector is electrically connected to the control circuit 72' forming part of the air-fuel ratio control means (no numeral). The circuit is arranged to generate a first command signal to place each fuel injector into the first state and a second command signal to place each fuel injector into the second state. The control circuit 72' is, in turn, electrically connected to the exhaust gas sensor 74 located within an exhaust manifold 92 serving as a thermal reactor or reactor means forming part of the exhaust passage 31. The exhaust manifold 92 is communicable with the four combustion chambers $C_1$ to $C_4$ through so-called siamesed exhaust ports 94 each of which is formed in the cylinder head 14 such that the outlets of the exhaust ports of two adjacent combustion chambers are combined to form only one outlet. Reference numeral 96 indicates port liners which cover the inner surface of the siamesed exhaust ports 94. The exhaust manifold 92 communicates through the connecting pipe 30 with the three-way catalytic converter 32.

The control circuit 72' is designed to supply the fuel injectors 90a and 90d with command signals for causing the fuel injectors to inject the optimum amounts of fuel at the optimum timings in response not only to the information signals from the exhaust gas sensor 74 but also to the information signals from an intake air temperature sensor, a throttle position (opening degree) sensor, an air flow amount sensor, and an engine coolant temperature sensor.

It is to be noted that the since the temperature of the exhaust gases discharged from the combustion chambers, in this instance, is maintained relatively high because of the siamesed exhaust ports and the port liners 96, HC and CO contained in the exhaust gases discharged from the combustion chambers are effectively burned within the exhaust manifold 92 serving as a thermal reactor, making it possible to decrease the capacity or volume of the three-way catalytic converter 32. Additionally, if the outer surface of the exhaust passage 31 is heat-insulated, the noxious gas decreasing effect of the three-way catalytic converter 32 may be furthermore improved.

With the engine 10' of this instance, the fuel injection from the fuel injectors provides improved fuel distribution to respective combustion chambers.

Improved volumetric efficiency is also realized and therefore more stable operation of the engine and improved engine power output performance are obtained.

While only four cylinder engines have been shown and described hereinbefore, it will be understood that the principle of the present invention may be applied to engine having any other number of cylinders.

It will be appreciated that the stoichiometric air-fuel ratio of the mixture supplied to the combustion chamber may be somewhat modified during engine warm-up period or high engine speed and load operation in order to obtain more stable engine operation and high engine output power.

As is apparent from the foregoing discussion, according to the present invention, NOx emission is effectively prevented firstly by suppressing NOx generation in the combustion chamber and thereafter by reducing the relatively small amount of NOx in the three-way catalytic converter. While, CO and HC emissions are also effectively prevented firstly by supplying the combustion chamber with stoichiometric air-fuel mixture and by controlling the valve overlap, and thereafter by oxidizing the CO and HC in the three-way catalytic converter. Therefore, the noxious constitutents in the exhaust gases discharged from the combustion chamber are almost completely removed to discharge the harmless exhaust gases into the atmosphere. Additionally, since the air-fuel ratio of the air-fuel mixture supplied to the combination chambers of the engine is controlled with a high degree of accuracy at approximately stoichiometric, the fuel consumption of the engine is improved, contributing to fuel economy.

Figure 7:
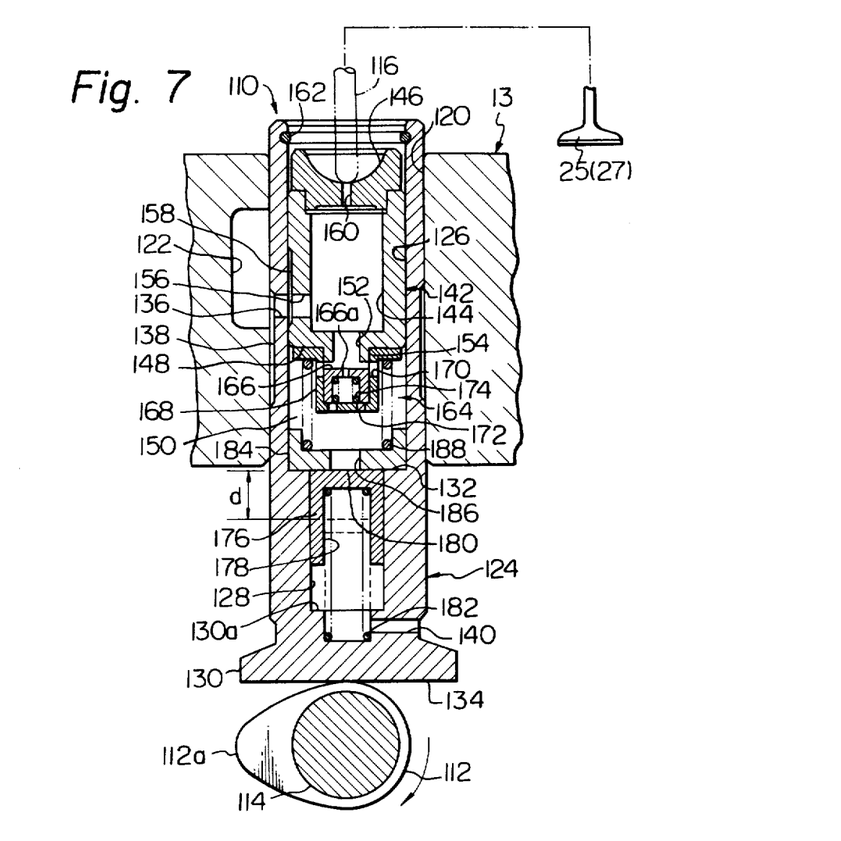
FIG. 7 is a longitudinal sectional view of a preferred example of a hydraulic valve lifter used for controlling the valve overlap of the intake and exhaust valves of the engine of FIGS. 1 and 6.
Figure 8:
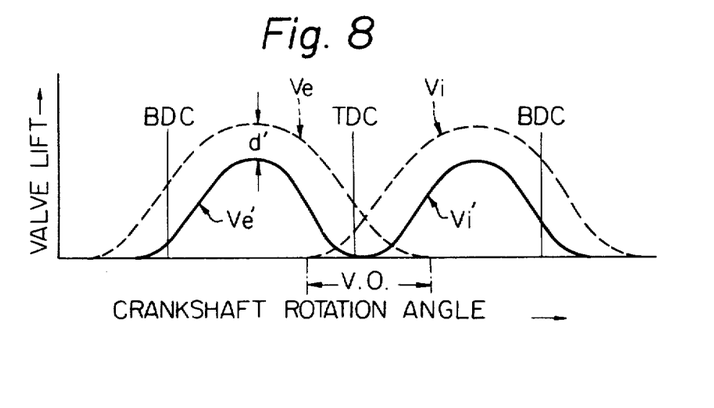
FIG. 8 is a graph showing variations in operations of intake and exhaust valves, in terms of valve lift and crankshaft rotation angle.

Referring to FIG. 7, a preferred example of hydraulic valve lifter or tappet 110 forming part of a valve train of the internal combustion engine 10 intervenes between a cam 112 on a camshaft 114 and a member 116 connecting the lifter to the head of an intake valve 25 or an exhaust valve 27 of the cylinder 12 of the engine. In this case, at least one of the intake and exhaust valves 25 and 27 is arranged to be operated by the valve lifter 110. The connecting member 116 may be a push-rod in an I-head or overhead-valve engine or the stem of the intake or exhaust valve in an L-head engine. For convenience sake, the connecting member 116 is herein assumed to be a push-rod which is connected to the rocker arm (not shown) of the engine cylinder. The valve lifter 110 rides on the cam 112 and acts as a follower for the cam 112 which rotates with the camshaft 114. The camshaft 114 is rotatable about an axis perpendicular to the valve lifter 110 and is adapted to be driven from the crank-shaft (not shown) of the engine by a chain and sprocket arrangement or a gear combination as is well known in the art. The valve lifter 110 is supported by a suitable stationary structure of the engine such as for example the cylinder block 13 through an elongated opening 120 formed therein. The cylinder block 13 is formed with an engine oil gallery 122 which is in communication with the engine oil pump (not shown) which delivers lubricating oil for the engine when the engine is in operation.

The valve lifter 110 comprises a hollow cylinder 124 which is axially slidable through the opening 120 in the cylinder block 13 and which has opposite end portions projecting outwardly and inwardly from the cylinder block 13. The cylinder 124 has an outer peripheral surface which is exposed in part to the above mentioned engine oil gallery 122 in the cylinder block 13. The cylinder 124 is formed with a first axial bore 126 open at one end of the cylinder 124 and terminating approximately halfway of the cylinder and a second axial bore 128 contiguous at one end to the first axial bore 126 and closed at the other end of the cylinder 124 by an end wall portion 130 of the cylinder 124. The second axial bore 128 is smaller in diameter than the first axial bore 126 so that the cylinder 124 is formed with an annular internal face 132 defining the inner end of the first axial bore 126 as shown. The volume, especially the length, of the second axial bore 128 is determined in relation to the volume of the first axial bore 126 depending upon the desired performance characteristics of the valve lifter 110, as will be described later. The end wall portion 130 of the cylinder 124 has a smooth, preferably slightly concave end face 134 which is in contact with the cam 112 on the camshaft 114. The cylinder 124 has formed in its cylindrical wall portion defining the first axial bore 126 an opening 136 providing communication between the axial bore 126 and the above mentioned engine oil gallery 122 in the cylinder block 13. To enable the opening 136 to establish constant communication between the oil gallery 122 and the axial bore 126 in the cylinder 124 which is axially movable relative to the cylinder block 118, the cylindrical wall portion of the cylinder 124 is formed with an undercut 138 extending axially in opposite directions from the radially outer end of the opening 136 as shown. The cylinder 124 is further formed with a vent 140 in its cylindrical wall portion adjacent the closed end of the second axial bore 128 for providing constant communication between the axial bore 128 and the open air, for the reason which will be clarified as the description proceeds.

A hollow plunger 142 is axially slidable in the first axial bore 126 in the cylinder 124 thus configured. The plunger 142 is formed with an axial bore 144 which is closed at its axially outer end by a push-rod seat member 146. The plunger 142 has an end wall portion 148 at its axially inner end and, thus, forms in the first axial bore 126 in the cylinder 124 a cylinder chamber 150 which is defined between the end wall portion 148 of the plunger 142 and the previously mentioned annular internal face 132 of the cylinder 124. The cylinder chamber 150 is axially collapsible and extensible as the cylinder 124 and the plunger 142 are axially moved relative to each other. The end wall portion 148 of the plunger 142 is formed with an opening 152 for providing communication between the bore 144 in the plunger 142 and the above mentioned cylinder chamber 150. The end wall portion 148 further has an annular projection 154 encircling the axially outer end of the opening 152. The plunger 142 has formed in its cylindrical wall portion an opening 156 which is in constant communication with the opening 136 in the cylinder 124. To assure the constant communication between the openings 136 and 156, the cylindrical wall portion of the plunger 142 is formed with an undercut 158 extending axially in opposite directions from the radially outer end of the opening 156 in the plunger 142 as shown. As an alternative to the undercut 158 formed in the plunger, an undercut may be formed in the cylinder 124 in a manner to extend axially in opposite directions from the radially inner end of the opening 136 in the cylinder 124 though not shown. Constant communication is thus established between the axial bore 144 in the plunger 142 and the engine oil gallery 122 in the cylinder block 13 through the openings 136 and 156 even when the cylinder 124 and the plunger 142 are axially moved relative to each other and to the cylinder block 13. The push-rod seat member 146 has a semicylindrically concave outer face for slidably receiving thereon the leading end of the push-rod 116. The seat member 146 is usually formed with an aperture 160 for providing communication between the axial bore 144 in the plunger 142 and the passageway (not shown) formed in the push-rod 116 for conducting engine oil from the bore 144, through the passageway in the push-rod 116 to the rocker arm (not shown), where the oil lubricates the rocker arm assembly as is well known in the art. Designated by reference numeral 162 is a retainer for preventing the plunger 142 from being moved out of the cylinder bore 126.

The valve lifter 110 further comprises a check valve assembly 164 which is mounted on the end wall portion 148 of the plunger 142. The check valve assembly 164 comprises a cup-shaped valve element 166 having a disc portion engageable with the annular projection 154 of the end wall portion 148 of the plunger 142. The valve element 166 is axially movably enclosed within a retainer 168 which has a flange portion secured to the end wall portion 148 of the plunger 142 and a cup-shaped portion projecting into the cylinder chamber 150. The retainer 168 is formed with apertures 170 in its cup-shaped portion for providing communication between the opening 152 in the end wall portion 148 and the cylinder chamber 150 when the valve element 166 is unseated from the annular projection 154 of the end wall portion 148 as shown. The cup-shaped portion of the retainer 168 is further formed with apertures 172 providing constant communication between the interior of the cup-shaped valve element 166 and the cylinder chamber 150 for the reason which will be understood as the description proceeds. The valve element 166 is slightly urged toward the annular projection 154 of the end wall portion 148 by means of a preload spring 174 which is seated between the valve element 166 and the retainer 168 as shown.

The arrangement thus far described of the plunger 142, push-rod seat member 146 and check valve assembly 164 are well known per se. When, thus, the intake or exhaust valve of the engine cylinder (not shown) is closed, oil which has been fed from the engine oil pump into the oil gallery 122 is forced into the axial bore 144 in the plunger 142 through the opening 136 in the cylinder 124 and the opening 156 in the plunger 142. As the oil enters the axial bore 144 in the plunger 142, it acts on the valve element 166 of the check valve assembly 164 through the opening 152 in the end wall portion 148 of the plunger 142 and forces the valve element 166 to be disengaged from the annular projection 154 of the end wall portion 148 as illustrated. Oil now passes from the bore 144 in the plunger 142 into the cylinder chamber 150 through the opening 152 in the end wall portion 148 of the plunger and the apertures 170 in the valve retainer 168, forcing the cylinder chamber 150 to axially extend. The plunger 142 is therefore urged toward the push-rod 116 and takes up clearance between the push-rod 116 and the push-rod seat member 146 and, at the same time, the cylinder 124 is urged toward the cam 112 on the camshaft 114 and, thus, takes up clearance between the cam 112 and the slide end face 134 of the cylinder 124. When the valve element 166 is moved away from the annular projection 154 of the end wall portion 148 of the plunger 142 as above described, the oil filling the space between the valve element 166 and the cup-shaped portion of the valve retainer 168 is allowed into the cylinder chamber 150 through the apertures 172 in the retainer 168.

Now, when the cam 112 is slidable contact with the slide end face 134 of the cylinder 124 is rotated with the camshaft 114 in synchronism with the engine crankshaft (not shown) and has its lobe brought into contact with the slide end face 134, the cylinder 124 is axially moved away from the camshaft 114 and causes the cylinder chamber 150 to axially contract. This creates a sudden increase in the pressure of the oil in the cylinder chamber 150 and causes the valve element 166 to move onto the annular projection 154 of the end wall portion 148 of the plunger, thereby closing the opening 152 in the end wall portion 148. The oil which has been directed into the cylinder chamber 150 is now trapped in the chamber 150 and hydraulically locks the operating length of the valve lifter 110, which thus acts as a simple one-piece lifter. The lifter 110 moves as a solid unit away from the camshaft 114 and causes the intake or exhaust valve of the engine cylinder to open. Then, when the lobe of the cam 112 moves out of engagement with the slide end face 134 of the cylinder 124, the valve spring on the intake or exhaust valve forces the valve to close and the lifter 110 to move backwardly toward the camshaft 114. This causes reduction of the pressure on the oil in the cylinder chamber 150 and lowers the valve element 166 to be disengaged from the plunger 142. Communication is for a second time provided between the cylinder chamber 150 and the axial bore 144 in the plunger 142 so that the oil from the engine oiling system is again forced past the check valve assembly 164 to replace whatever oil may have leaked from the cylinder chamber 150.

The valve lifter 110 thus comprises, in addition to the plunger 142 and the check valve assembly 164, a floating piston 176 which is axially slidable in the second axial bore 128 in the cylinder 124. The floating piston 176 has an axial bore 178 which is open at its end closer to the end wall portion 130 of the cylinder 124 and closed at the opposite end by an end wall portion 180 facing the above mentioned cylinder chamber 150. The floating piston 176 is urged axially away from the end wall portion 130 of the cylinder 124 by suitable biasing means such as a preload spring 182 which is seated at one end on the inner faces of the end wall portions 130 and 180 of the cylinder 124 and the floating piston 176, respectively, as shown. The movement of the floating piston 176 toward the first axial bore 126 is limited by a balancing piston 184 which is axially slidable in the cylinder chamber 150 and which is formed with an opening 186. The balancing piston 184 is axially urged to rest on the previously mentioned annular internal face 132 of the cylinder 124 by suitable biasing means such as a preload spring 188 which is seated at one end of the balancing piston 184 and at the other end on the flange portion of the valve retainer 168. When the valve lifter 110 is in use, the balancing piston 184 is biased toward the position contacting the annular internal face 130 not only by the force of the preload spring 188 but the pressure of oil in the cylinder chamber 150. The valve element 166 is formed with an orifice 166a providing constant but restricted communication between the cylinder chamber 50 and the axial bore 144 in the plunger 142 through the opening 152 in the end wall portion 148 of the plunger. In the event the pressure of oil in the cylinder chamber 150 happens to lower excessively due to leakage of oil from the chamber and as a consequence the cylinder chamber 150 tends to contract. The preload spring 188 maintains the volume of the chamber 150 and causes the oil to be forced from the bore 144 in the plunger 142 into the cylinder chamber 150 through the orifice 166a in the valve element 166 and the apertures 172 in the valve retainer 168 under the influence of the suction induced in the cylinder chamber 150. The balancing piston 184 is, thus, held in the position in contact with the annular internal face 132 the cylinder. The balancing piston 184 held in this position has an outer end face located at the inner end of the second axial bore 128 in the cylinder 124, as illustrated. The floating piston 176 in the second axial bore 128 is, accordingly, axially movable between a first position remotest from the end wall portion 130 of the cylinder 124 and thus having its end wall portion 180 in contact with the balancing piston 188 in the above described position thereof as indicated by full lines and a second position remotest from the balancing piston 188 and having its open end in contact with the annular internal face 130a of the end wall portion 130 of the cylinder 124 as indicated by broken lines. The distance of stroke of the floating piston 176 thus movable between the above mentioned first and second positions is indicated by d in FIG. 7. The preload spring 182 urges the floating piston 176 to be held in the first position thereof. When the floating piston 176 is held in the first position by the force of the preload spring 182, the end wall portion 180 of the floating piston 176 is in contact with the balancing piston 184 serving as a stop for the floating piston 176 and, accordingly, has its outer face exposed in part to the oil in the cylinder chamber 150 through the opening 186 in the balancing piston 184. When the floating piston 176 is moved from the first position into the second position against the opposing force of the preload spring 182, then the end wall portion 180 of the floating piston 176 is spaced a distance d from the end face of the balancing piston 184 and forms a chamber in the second axial bore 128 between the end faces of the floating and balancing pistons 176 and 184 though not seen in the drawings. The particular chamber, herein called the auxiliary cylinder chamber in contrast to the main cylinder chamber 150, is in communication with the main cylinder chamber 150 through the opening 186 in the balancing piston 184 and is continuously contractable from a maximum volume condition provided by the floating piston 176 in the second position to a zero volume position provided by the piston 176 in the first position. The axial position of the floating piston 176 relative to the cylinder 124, viz., the volume of the auxiliary chamber is determined by the equilibrium condition between the force of the preload spring 182 and the oil pressure which is exerted on the end wall portion 180 of the floating piston 176 from the main cylinder chamber 150 through the opening 186 in the balancing piston 184. In other words, the volume of the auxiliary chamber varies with the oil pressure developed in the main cylinder chamber 150 because the spring constant of the preload spring 182 opposing the oil pressure is preselected. The space in the second axial bore 126 between the end wall portions 130 and 180 of the cylinder 124 and the floating piston 176 thus arranged is in constant communication with the open air through the vent 140 so that air in the particular space is allowed out of the space when the floating piston 176 is moved toward the second position thereof.

As is well known in the art, the pressure of the engine oil delivered from the engine oil pump varies with engine speed usually from about 5 kgs/cm$^2$ at maximum engine speed to about 1.5 kg/cm$^2$ during idling condition of the engine. When the intake or exhaust valve associated with the valve lifter 110 is open in the absence of a force which is exerted on the lifter cylinder 110 from the cam 112, the oil pressure developed in the main cylinder chamber 150 is equal to the oil pressure in the oil gallery 122 and is, therefore, in direct relation to the engine speed. The preload spring 182 acting on the floating piston 176 is, thus, selected so that the spring overcomes the oil pressure exerted on the floating piston 176 and forces the piston 176 into the first position thereof when the lowest engine oil pressure of, for example, 1.5 l kg/cm$^2$ occurs in the main cylinder chamber 150 under the idling condition of the engine and that the spring yields to the oil pressure on the floating piston 176 and allows the piston to be moved into the second position when the highest engine oil pressure of, for example, 5 l kg/cm$^2$ occurs in the main cylinder chamber 150 with the engine operating at a maximum speed.

When, thus, the engine is operating at the maximum speed, the floating piston 176 is maintained in the second position thereof providing the maximum volume of the auxiliary cylinder chamber, irrespective of the axial position of the plunger 142 relative to the cylinder 124. Under these conditions, the opening and closing timings and the lift of the intake or exhaust valve controlled by the valve lifter 110 are dictated by the sum of the amount of oil in the main cylinder chamber 150 and the amount of oil in the auxiliary cylinder chamber in the maximum volume condition. Accordingly, the intake or exhaust valve is controlled as indicated by broken curves Vi or Ve shown in FIG. 8. As seen in FIG. 8, the valve overlap indicated by V.O. is the maximum when the engine is operating at the maximum speed.

As the engine speed is reduced below the maximum level and accordingly the engine-oil-pump pressure diminishes below the maximum level thereof, the oil pressure developed in the main and auxiliary cylinder chambers decline during the condition in which the intake or exhaust valve is open in the absence of a driving force exerted on the valve lifter 110 from the cam 112. The floating piston 176 is therefore moved from the second position toward the first position thereof over a distance corresponding to the decrement in the engine oil pressure by reason of the biasing force of the preload spring 182 until equilibrium is obtained between the force of the spring 182 and the oil pressure acting on the floating piston 176. The auxiliary chamber is thus contracted from its maximum volume condition into a partial volume condition. Now, when the cam 112 is rotated and forces the lifter cylinder 124 away from the camshaft 114 by the cam lobe 112a, the oil in the main and auxiliary cylinder chamber is compressed with an increased pressure developed therein and forces the floating piston 176 to axially move back into the second position thereof against the opposing force of the preload spring 182. This causes the plunger 142 to move toward the auxiliary cylinder chamber over a distance substantially proportional to the distance of movement of the floating piston, producing retardation and advance of the opening and closing timings, respectively, of the valve and reducing the lift of the valve by amounts which are substantially proportional to the decrement of the engine oil pressure or, in other words, to the decrement of the engine speed. When the engine is being operated at idle with the engine oil pressure reduced to the lowest level thereof, the floating piston 176 is held in the first position thereof during the condition in which the intake or exhaust valve is open. When the lifter cylinder 124 is moved away from the camshaft 14 by the lobe 112a of the cam 112 under these conditions, the floating piston 176 is forced to move from the first position into the second position over the distance d indicated in FIG. 7. The opening and closing timings of the intake or exhaust valve are accordingly retarded and advanced, respectively, as indicated by solid curves Ve' or Vi'. Then, the lift of the valve is reduced by amounts proportional to the distance d of movement of the floating piston 176, as indicted by d' in FIG. 8. As seen from FIG. 8, the period of the valve overlap is reduced to zero when the engine is being operated at idle.

The valve lifter 110 is thus operative to vary the opening and closing timings of the intake or exhaust valve to vary the valve overlap in response to engine speed, enabling the engine to achieve the maximum valve overlap at maximum speed and reducing the period of the valve overlap to zero during idling.

What is claimed is:

1. A spark-ignition internal combustion engine, comprising means for defining a combustion chamber having an intake and exhaust valve;

air-fuel mixture supply means for producing an air-fuel mixture by mixing fuel and intake air and supplying it into the combustion engine;

means for adding substantially inert gas to the air-fuel mixture in the combustion chamber, said substantially inert gas consisting of mixed gases which remain substantially inert in the combustion carried out in the combustion chamber, said inert gas adding means including exhaust gas recirculating means for recirculating a portion of the exhaust gas of the engine back to the combustion chamber through the air-fuel mixture supply means of the engine, and means for variably controlling the amount of residual gases remaining in the combustion chamber after each exhaust stroke of the engine in response to an engine operating parameter, said variable control means including valve overlap control means for varying the valve overlap of said intake and exhaust valves by an amount greater than about 35 degrees in crank angle of the engine in response to changes in the engine operating parameter, whereby said substantially inert gas includes the recirculated exhaust gas and residual gas which remains in the combustion chamber;

two spark plugs disposed in the combustion chamber for igniting the air-fuel mixture mixed with the substantially inert gas;

a three-way catalytic converter capable of reducing nitrogen oxides and oxidizing carbon monoxide and hydrocarbons, communicable with the combustion chamber for receiving the exhaust gases discharge from the combustion chamber, said three-way catalytic converter being most effective when supplied with the exhaust gases which are produced by supplying the combustion chamber with the air-fuel mixture having a stoichiometric air-fuel ratio; and air-fuel ratio control means for controlling the air-fuel ratio of the air-fuel mixture supplied into the combustion chamber at the stoichiometric air-fuel ratio in accordance with the composition of the exhaust gases discharged from the combustion chamber.

2. A spark-ignition internal combustion engine as claimed in claim 1, in which the valve overlap control means is operative to control the valve overlap within a range of a minimum of zero overlap during engine idling to a maximum of between about 35 to 60 degrees of engine crank angle during high speed operation of the engine.

3. A spark-ignition internal combustion engine as claimed in claim 1, in which said engine operating parameter is engine speed.

4. A spark-ignition internal combustion engine as claimed in claim 3, in which the valve overlap control means includes a valve lifter mechanically connected to at least one of the intake and exhaust valve to control the valve lift of at least one of the intake and exhaust valves.

5. A spark-ignition internal combustion engine as claimed in claim 4, in which said valve lifter comprises an axially movable cylinder formed with axially aligned first and second axial bores which are continuous to each other, a plunger axially slidable in said first axial bore and defining in the first axial bore a main cylinder chamber contiguous to said second axial bore and axially contractable and extendable respectively as said plunger is axially moved toward and away from said second axial bore, passageway means formed in said cylinder and said plunger for providing communication between said main cylinder chamber and a source of fluid under pressure, check valve means positioned within said main cylinder chamber for blocking the communication between the cylinder chamber and the fluid source in response to an increase in the fluid pressure in said main cylinder chamber over the fluid pressure developed in said passageway means, a floating piston axially slidable in said second axial bore for defining in the second axial bore an auxiliary cylinder chamber which is in communication with said main cylinder chamber and which is continuously axially contractable between a zero volume condition and a maximum volume condition as said floating piston is axially moved in said second axial bore in response to variation in the fluid pressure in the main cylinder chamber, and biasing means for urging said floating piston toward an axial position providing said zero volume condition of said auxiliary cylinder chamber.

6. A spark-ignition internal combustion engine as claimed in claim 5, in which said floating piston has a closed axial end and is axially movable in said second axial bore between a first position having said closed axial end contiguous to said first axial bore for providing said zero volume condition of said auxiliary cylinder chamber and a second position having said closed axial end located remotest from said first axial bore for providing said maximum volume condition of said auxiliary cylinder chamber.

7. A spark-ignition internal combustion engine as claimed in claim 5, further comprising a balancing piston axially slidable in said main cylinder chamber and formed with an opening providing communication between said main and auxiliary cylinder chambers, biasing means for urging said balancing piston toward an axial position having an axial end contiguous to said second axial bore, and passageway means constantly providing restricted communication between said main cylinder chamber and said passageway means communicating with said fluid source.

8. A spark-ignition internal combustion engine as claimed in claim 7, in which said second axial bore is smaller in diameter than said first axial bore with said cylinder formed with an annular internal face between the first and second axial bores, said blancing piston being onto said annular internal face by said biasing means associated therewith for limiting the axial movement of said floating piston into the position providing said zero volume condition of said auxiliary cylinder chamber.

9. A spark-ignition internal combustion engine as claimed in claim 5, in which said floating piston further defines in said second axial bore a chamber hermetically isolated from said auxiliary cylinder chamber by the floating piston and in constant communication with the open air.

10. A spark-ignition internal combustion engine as claimed in claim 1, in which said exhaust gas recirculating means includes conduit means connecting a portion of the exhaust system of the engine and a portion of the intake system of the engine for introducing the exhaust gases into the intake system, and a control valve disposed in said conduit means for controlling the amount of the exhaust gases passing through the conduit means.

11. A spark-ignition internal combustion engine as claimed in claim 1, in which the combustion chamber defining means includes the cylindrical inner wall of the cylinder of the engine, the inner wall of a cylinder head closing the one end of the cylinder, and the crown of a piston reciprocally disposed within the cylinder.

12. A spark-ignition internal combustion engine as claimed in claim 11, in which said two spark plugs are located such that an intermediate point of the spark gap of the two electrodes of a spark plug and an intermediate point of the spark gap of the two electrodes of another spark plug constitute an angle ranging from 110 to 180 degrees with respect to the center axis of the cylinder.

13. A spark-ignition internal combustion engine as claimed in claim 12, in which said two spark plugs are located such that the shortest distance between the intermediate point of the spark gap of each spark plug and the center axis of the cylinder is 0.15 to 0.45 times of the diameter of the cylinder bore.

14. A spark-ignition internal combustion engine as claimed in claim 1, in which said air-fuel mixture supply means includes a carburetor having a main discharge nozzle opened into the venturi portion of the carburetor, a main well communicating through a main fuel passage with the main discharge nozzle and communicating with the float bowl of the carburetor, a main air bleed communicating with the main well for introducing therethrough the atmospheric air into the main well, and a first auxiliary air bleed communicated with the main well for introducing therethrough the atmospheric air into the main well.

15. A spark-ignition internal combustion engine as claimed in claim 14, in which said air-fuel ratio control means includes:

first air flow amount control means for controlling flow amount of air inducted through the first auxiliary air bleed into the main well, said first air flow amount control means being operated electrically and arranged to take a first state wherein the flow amount of the air is increased above a predetermined level and a second state wherein the flow amount of the air is decreased below the predetermined level;

control circuit electrically connected to said air flow amount control means and arranged to generate a first command signal to place said air flow amount control means into the first state and a second command signal to place said air flow amount control means into the second state;

an exhaust gas sensor disposed within the exhaust gas passage of the exhaust system communicable with the combustion chamber of the engine and electrically connected to said control circuit, said exhaust gas sensor being arranged to generate a first information signal for causing said control circuit to generate the first command signal when the exhaust gases passing through the exhaust passage have a first composition representing that the combustion chamber is fed with an air-fuel mixture richer than that having stoichiometric air-fuel ratio, and a second information signal for causing said control circuit to generate the second command signal when the exhaust gases passing through the exhaust passage have a second composition representing that the combustion chamber is fed with an air-fuel mixture leaner than that having the stoichiometric air-fuel ratio.

16. A spark-ignition internal combustion engine as claimed in claim 15, in which said air flow amount control means includes a first solenoid valve having an actuating member which is arranged to be movable with respect to the first auxiliary air bleed to increase the flow amount of air inducted through the first auxiliary air bleed into the main well above the predetermined level upon receiving the first command signal from the control circuit, and movable with respect to the first auxiliary air bleed to decrease the flow amount of the same air below the predetermined level upon receiving the second command signal from said control circuit.

17. A spark-ignition internal combustion engine as claimed in claim 1, in which said air-fuel mixture supply means includes an intake air passage means for introducing air into the combustion chamber, and a fuel injector disposed in said intake air passage means for injecting fuel into the upstream portion of the combustion chamber, said fuel injector being arranged to take a first state wherein the injection time of the injector is decreased below a predetermined level, and a second state wherein the injection time of the injector is increased above the predetermined level.

18. A spark-ignition internal combustion engine as claimed in claim 17, in which said air-fuel ratio control means includes:
   a control circuit electrically connected to said fuel injector and arranged to generate a first command signal to place said fuel injector into the first state and a second command signal to place said fuel injector into the second state; and an exhaust gas sensor disposed within the exhaust passage of the exhaust system communicable with the combustion chamber of the engine and electrically connected to said control circuit, said exhaust gas sensor being arranged to generate a first information signal for causing said control circuit to generate the first command signal when the exhaust gas passing through the exhaust passage have a first composition representing that the combustion chamber is fed with an air-fuel mixture richer than that having stoichiometric air-fuel ratio, and a second command signal for causing said control circuit to generate the second command signal when the exhaust gases passing through the exhaust passage have a second composition representing that the combustion chamber is fed with an air-fuel mixture leaner than that having stoichiometric air-fuel ratio.

19. A spark-ignition internal combustion engine as claimed in claim 17, further comprising reactor means for oxidizing the unburned constituents contained in the exhaust gases discharged from the combustion chamber, said reactor means being disposed between the combustion chamber and said three-way catalytic converter to receive the exhaust gases from the combustion chamber and introduce the exhaust gases passing therethrough into said three-way catalytic converter.

* * * * *